United States Patent [19]

Straub

[11] Patent Number: 5,203,594
[45] Date of Patent: Apr. 20, 1993

[54] PIPE COUPLING

[75] Inventor: Immanuel Straub, Wangs, Switzerland

[73] Assignee: Straub Federnfabrik, Wangs, Switzerland

[21] Appl. No.: 716,625

[22] Filed: Jun. 17, 1991

[30] Foreign Application Priority Data

Jun. 18, 1990 [CH] Switzerland .................. 02025/90

[51] Int. Cl.⁵ .......................................... F16L 17/035
[52] U.S. Cl. .................................... 285/112; 285/373; 285/383
[58] Field of Search ............... 285/373, 112, 104, 105, 285/108, 383

[56] References Cited

U.S. PATENT DOCUMENTS

| | | |
|---|---|---|
| 2,184,376 | 12/1939 | Beyer et al. |
| 2,272,811 | 2/1942 | Nathan .................... 285/110 |
| 2,295,510 | 9/1942 | Ball et al. ................ 285/373 X |
| 2,398,399 | 4/1946 | Alexander ............... 285/110 X |
| 2,445,151 | 7/1948 | Newell . |

(List continued on next page.)

FOREIGN PATENT DOCUMENTS

| | | |
|---|---|---|
| B41660/64 | 9/1965 | Australia . |
| B58053/86 | 12/1986 | Australia . |
| 484214 | 6/1952 | Canada . |
| 695250 | 9/1964 | Canada . |
| 995710 | 8/1976 | Canada . |
| 0186728 | 7/1980 | European Pat. Off. . |
| 0057373 | 8/1982 | European Pat. Off. . |
| 0175856 | 4/1986 | European Pat. Off. . |
| 0453908 | 12/1927 | Fed. Rep. of Germany ...... 285/112 |
| 1031066 | 5/1938 | Fed. Rep. of Germany . |
| 913114 | 8/1946 | France . |
| 0033154 | 10/1970 | Japan ................................. 285/112 |
| 0021618 | 2/1979 | Japan ................................. 285/112 |
| 00216618 | 2/1979 | Japan . |
| 80206516 | 8/1991 | Taiwan . |
| 0315550 | 7/1929 | United Kingdom ................ 285/112 |

OTHER PUBLICATIONS

McMaster-Carr Supply Company Catalog.
Australian Office Action, Dec. 30, 1991.
Military Standardized handbook—Plastics MIL-HDBK-700 [MK], Nov. 1965, pp. 43, 44.

Primary Examiner—Dennis L. Taylor
Assistant Examiner—Heather Chun
Attorney, Agent, or Firm—Willian Brinks Olds Hofer Gilson & Lione

[57] ABSTRACT

A pipe coupling has a housing which is split in a longitudinal direction and has inwardly bent end walls and a steel insert sheet of analogous design bridging the housing gap. With the aid of a closure with tensioning screws, the housing can be constricted in the manner of a pipe clip. A sleeve, enclosed at the end faces and the circumference by the housing and a steel insert sheet, and roughly C-shaped in cross-sectionis compressed in the circumferential direction and is brought to bear on the pipe wall. As a result of inherent recovery capacity, an annular insert, flexible in the circumferential direction but rigid transversely thereto, bears on the sleeve web and thereby holds the sleeve web in surface contact with the housing even when the coupling is pressure less. In combination therewith, sliding rings are preferably located between the end faces of the sleeve and the end walls of the housing, which sliding rings close the annular gap remaining between the end walls of the housing and the pipe wall. The coupling is less sensitive to relative movements of the pipes which are caused by expansion. The insert can have extensions which can engage in the joint between the pipe ends, thereby facilitating the centering of the coupling upon assembly and preventing shifting of the coupling due to expansion.

21 Claims, 3 Drawing Sheets

U.S. PATENT DOCUMENTS

| | | | |
|---|---|---|---|
| 2,635,901 | 4/1953 | Osborn | 285/112 X |
| 2,822,192 | 2/1958 | Beatty | 285/110 X |
| 2,939,729 | 6/1960 | O'Shaughnessy, Jr. | 285/112 X |
| 2,971,781 | 2/1961 | Torres . | |
| 3,065,005 | 11/1962 | Hall, Sr. et al. . | |
| 3,179,445 | 4/1965 | Moretti | 285/383 X |
| 3,250,331 | 5/1966 | Boyle . | |
| 3,291,506 | 12/1966 | Blakeley | 285/112 |
| 3,394,952 | 7/1968 | Garrett | 285/383 X |
| 3,456,963 | 7/1969 | Dillon . | |
| 3,730,502 | 5/1973 | Viazzi | 285/110 |
| 3,877,733 | 4/1975 | Straub . | |
| 4,147,738 | 4/1979 | Schluter . | |
| 4,229,028 | 10/1980 | Gray | 285/383 X |
| 4,239,242 | 12/1980 | Burns | 285/111 |
| 4,240,654 | 12/1980 | Gladieux | 285/276 |
| 4,381,020 | 4/1983 | Daghe et al. . | |
| 4,426,106 | 1/1984 | McCoy | 285/423 X |
| 4,465,330 | 8/1984 | DeCenzo | 285/373 X |
| 4,606,564 | 8/1986 | Kurachi . | |
| 4,629,217 | 12/1986 | Straub . | |
| 4,664,422 | 5/1987 | Straub . | |
| 4,715,626 | 12/1987 | Gehring et al. . | |
| 4,834,398 | 5/1989 | Guzowski et al. | 285/379 |
| 5,039,137 | 8/1991 | Cankovic | 285/383 X |

PIPE COUPLING

CROSS REFERENCE TO RELATED PATENT APPLICATION

This patent specification is related to a copending patent application entitled "Pipe Coupling" naming the same inventor, filed on the same date as the present specification, and identified as Ser. No. 07/716,139. This copending patent application is hereby incorporated by reference herein.

BACKGROUND OF THE INVENTION

This invention relates to a pipe coupling of the type comprising an elastomer sealing sleeve which is approximately C-shaped in cross-section and which defines sealing lips which extend toward each other and are each supported on a sleeve web by means of an annular bead; a housing which surrounds the sleeve and defines radial end walls and a longitudinal gap; a closure which comprises tensioning bolts operative to constrict the housing; and an insert sheet which is inserted between the sleeve and the housing and bridges the longitudinal gap; wherein the sealing lips of the seal define first, larger dimensions before the housing is constricted; and wherein it is possible for the sealing lips to be compressed in the circumferential direction and to be pressed snugly onto a pipe wall due to compression of the annular beads as the housing is constricted.

Pipe couplings of this type, as shown, for example, in German Patent Specification 2,428,101 and corresponding U.S. Pat. No. 3,877,733, have revolutionized pipe connection technology. On the one hand, due to the fact that the sealing lips have larger dimensions in relation to the nominal diameter of the pipes to be connected prior to assembly, it is possible for the couplings to be pushed onto the pipes and installed together with the pipes, it being possible for the pipes simply to be placed next to one another and for the couplings then to be pushed over the joints. On the other hand, the compression of the lip seal in the circumferential direction due to the constrictable housing leads to the fact that the radial thickness of the sleeve increases so that the sleeve is not only pressed against the pipe wall by the housing, but the sleeve tends to mold itself to the pipe surface. This results in fully satisfactory sealing, even in the case of a rough or irregular pipe surface, and additionally in a sealing capability which remains intact for a long time.

The object of the present invention is to improve the known pipe coupling in such a way that the constrictability of the housing is utilized for increasing the insensitivity of the coupling with regard to changes due to expansion, especially when the coupling is pressure less.

SUMMARY OF THE INVENTION

According to this invention, a pipe coupling of the type described initially above is provided with an annular insert which is elastically flexible and constrictable in the circumferential direction but substantially rigid in the axial direction, which insert defines a base part supported against the sleeve web essentially over the full surface of the sleeve web.

Inasmuch as the sleeve web is pressed against the cylindrical jacket of the coupling housing by the insert even in the pressure less state, the sleeve web cannot arch inwardly if the sealed pipes move into the coupling as a result of expansion, tending to carry with them the sleeve areas closely surrounding them. A particularly advantageous effect is obtained in this connection if, as in certain embodiments described below, the annular gaps remaining in the assembled state of the coupling between the radial end walls of the coupling housing and the pipe wall are in each case closed by a sliding ring which can be compressed in the circumferential direction. With this measure, the wall of the sleeve in the root area between the sleeve web and the sealing lips can be constructed without a stiffening reinforcement, and the correspondingly increased flexing capacity of the sleeve in the root area also counteracts the tendency mentioned to deform the web, while reducing any tendency that the stiffening of the sleeve web by the insert may lead to an abrading relative movement between the sealing surfaces and the surfaces to be sealed.

Further advantageous aspects of the invention are defined in other dependent claims.

BRIEF DESCRIPTION OF THE DRAWINGS

The invention is explained in greater detail with reference to the attached drawings, in which.

DETAILED DESCRIPTION OF THE PRESENTLY PREFERRED EMBODIMENTS

Figure 1:
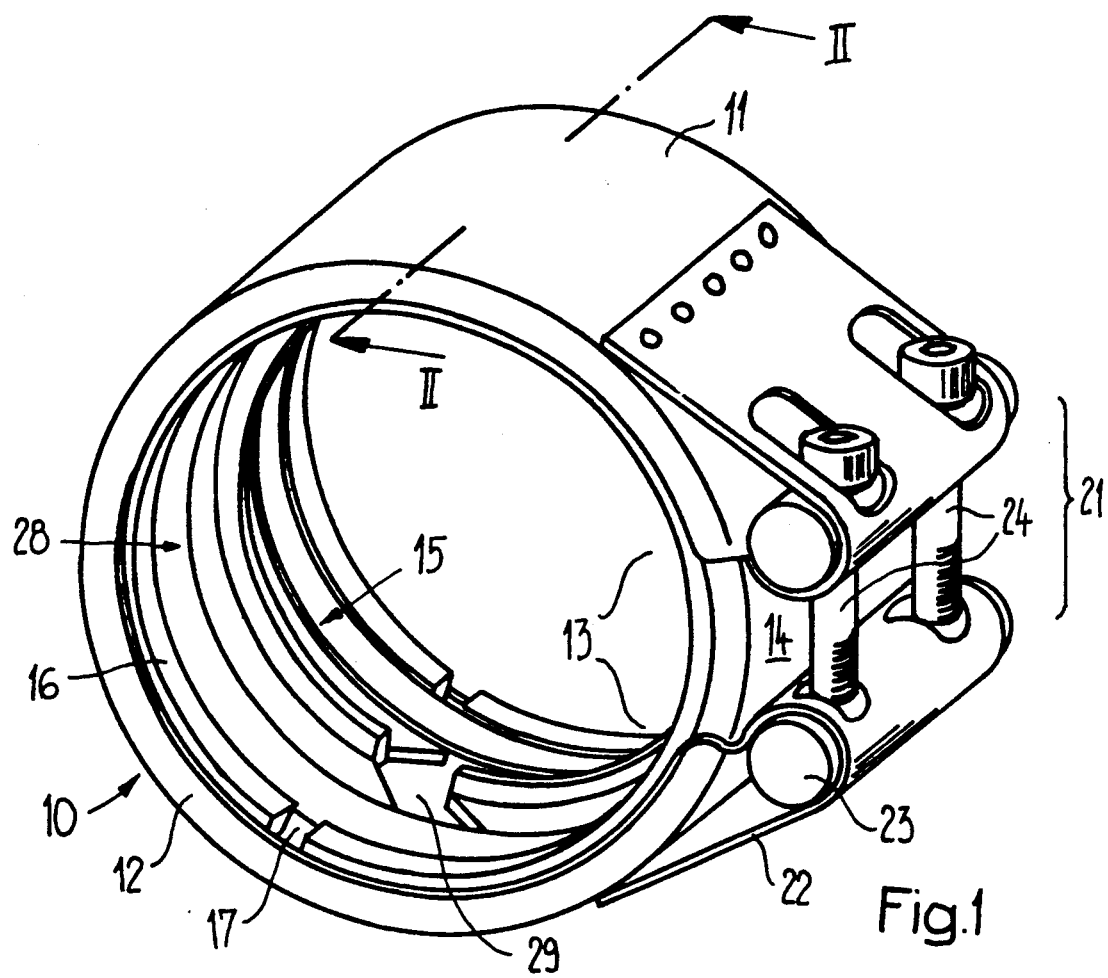
FIG. 1 shows a perspective illustration of a pre-assembled pipe coupling still in the opened-out state.

The housing 10 illustrated in FIG. 1 is split along its length and has a cylindrical jacket 11 and inwardly bent end walls 12. A steel insert sheet 14 bridges the housing gap 13 and is of analogous construction and together with the housing surrounds a space in which an elastomer sleeve 15 can readily be enclosed around its circumference and at the end faces. The following discussion proceeds on the assumption that the sleeve 15 is confined axially by the end walls 12 of the jacket 11, in the conventional manner; only later will reference be made to the fact that, according to the preferred embodiment of FIG. 1, a ring 16 having a slit 17 is preferably in each case located between the sleeve 15 and the end walls 12 of the housing.

The housing has a closure 21, consisting of tensioning straps 22, tensioning bars 23 and tensioning screws 24 which engage in tapped holes in one tensioning bar 23. The housing gap 13 is closed by tightening these screws, in the course of which the steel insert sheet 14 plunges deeper and deeper into the housing, and the housing is constricted like a pipe clip. As a result, the sleeve 15 is compressed in the circumferential direction; beads 25 formed on the sleeve web 20 act on the sealing lips 26, which are thereby likewise constricted and are brought to bear snugly on the pipe. In this assembled state of the coupling, an annular gap 27 remains in each case between the end walls 12 of the housing and the outer wall of the pipes to be coupled.

Located in the sleeve is an annular insert which is designated generally by the reference numeral 28 (also see FIG. 2) and has the form of a snap ring with a V- shaped joint. In cross-section, the snap ring is in the shape of a T having a flat base part 30 and an annular rib 31 projecting to the inside. The insert 28 is made of a material, e.g. plastic, which is flexible in the circumferential direction, it being dimensioned in such a way that the base part, as a result of the recovery capacity of the snap ring, bears snugly and essentially over the entire surface on the sleeve web, even if the coupling housing is still in the opened-out state. In this state of the coupling, the annular rib 31 has such a large inside diameter that the coupling can readily be pushed onto one of the pipes to be coupled and, after the pipes are installed, can be pushed over the joint on the same. On the other hand, after the housing is tightened, the annular rib 3i engages in this joint and prevents the coupling from shifting as a result of expansion movements of the pipes.

Figure 8:
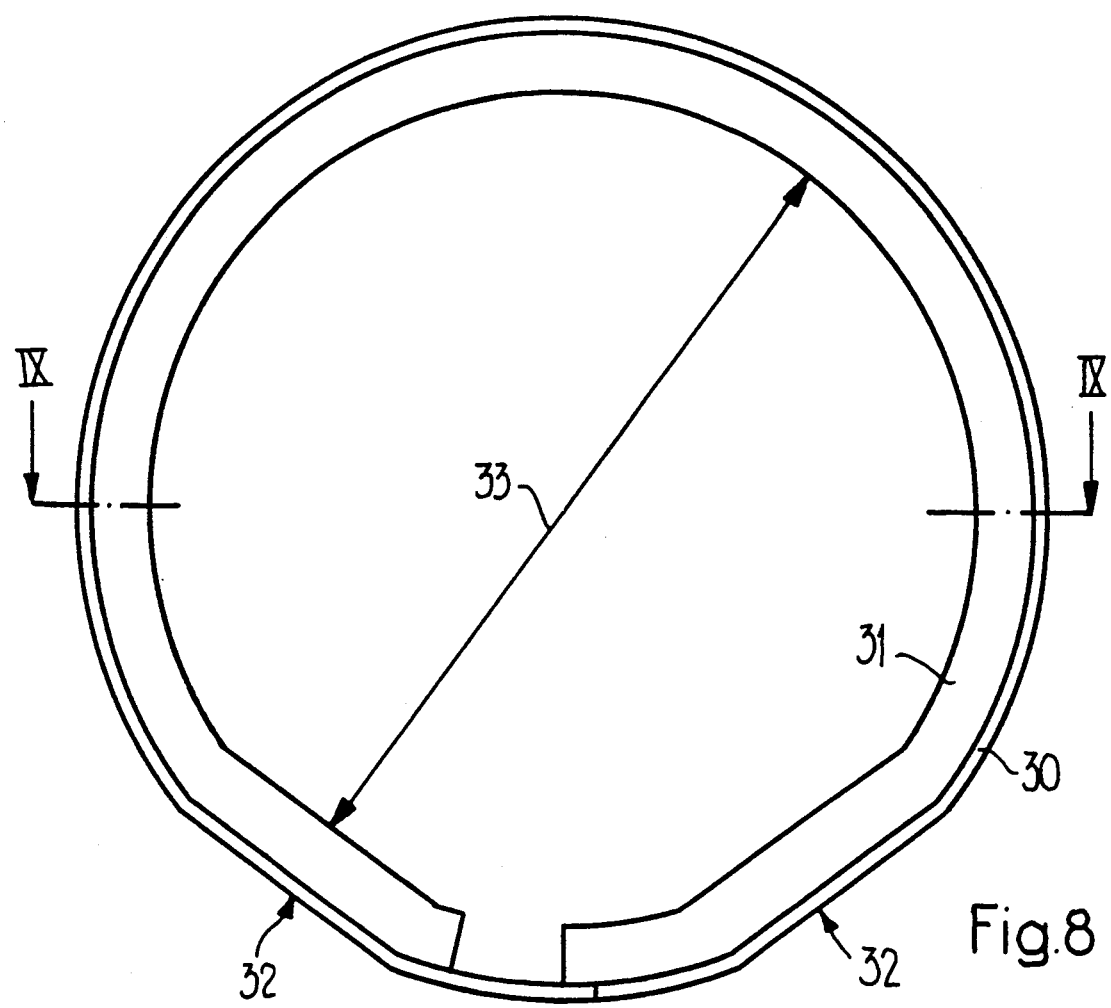
FIG. 8 shows an embodiment of the insert as viewed in the axial direction, having flattened end sections for facilitating the positioning of the coupling over the joint of the pipes to be connected.
Figure 9:
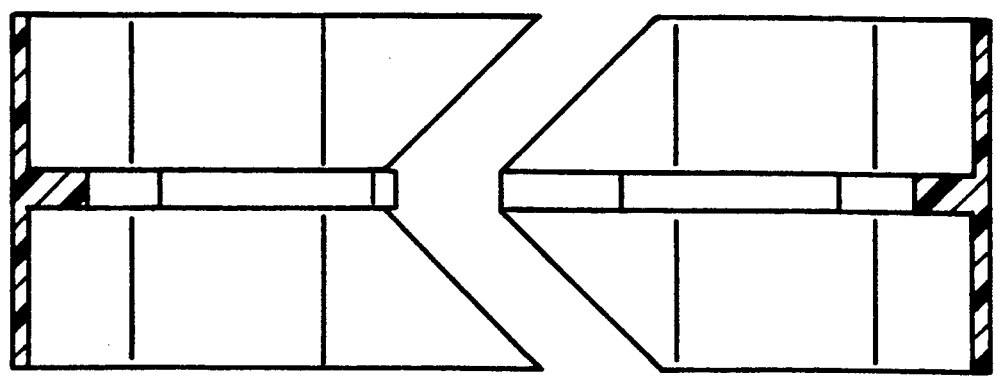
FIG. 9 shows a section along line IX—IX in FIG. 8.

It is apparent from FIG. 8 that the end sections of the insert, including the base part 30, and the annular rib 31, have two segments of enlarged radius of curvature, namely flats as shown at reference numeral 32. In the area of these flats, the inside diameter, illustrated by the double headed arrow 33, of the annular rib is smaller than the outside diameter of the pipes to be connected. Nonetheless, the coupling can easily be slipped onto one of the pipes, since the annular rib 31 and the base part 30 yield in the area of the flats 32 and can be pressed back in the radial direction. When the coupling is pushed over the joint between the pipe ends after the pipes are installed, the pressed-back sections of the annular rib 31 snap into the joint, and the coupling is thereby centered with regard to the joint. It is of course unnecessary for the annular rib 31 to be of continuous construction; it can have interruptions and be formed by a row of small blocks or pins.

It can easily be recognized from the above that the base part, bearing on the sleeve web virtually over the entire surface, keeps the sleeve web fully in contact with the cylindrical jacket 11 of the housing 10, even without internal pressure from the medium to be sealed, so that pipes extending into the coupling due to expansion do not cause the sleeve web 20 to lift from the housing jacket 11, and thus the areas of the sleeve which participate in the sealing cannot be pushed inwards; in this arrangement, the marginal edges of the base part 30 need not necessarily form stops interacting with the beads 25.

Figure 2:
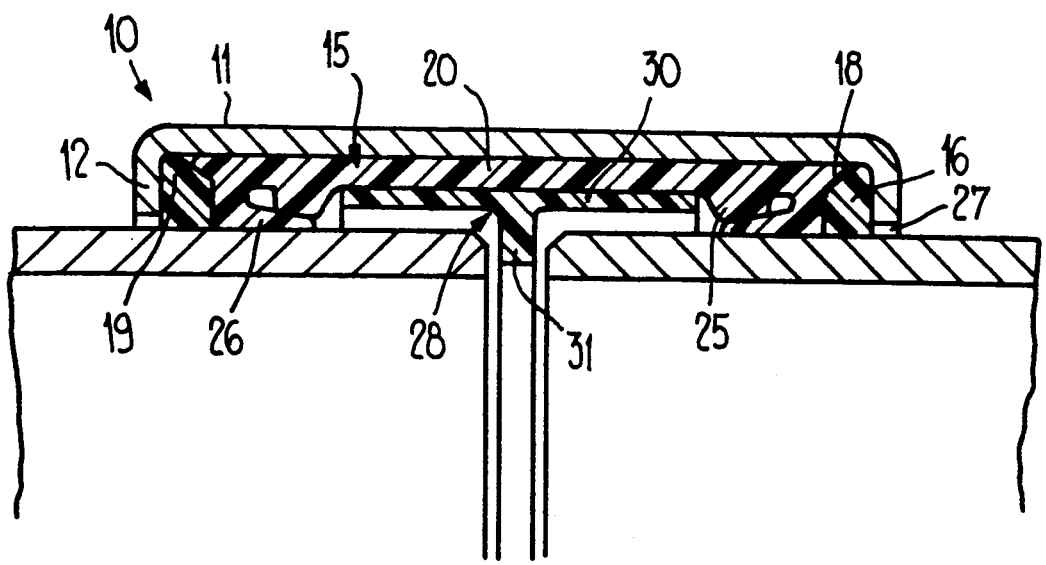
FIG. 2 shows a partial axial section along line II—II in FIG. 1 of the pipe coupling in the assembled state.
Figure 3:
FIGS. 3-7 show cross-sectional profiles for further variants of the insert.
Figure 4:
Figure 5:
Figure 6:
Figure 7:

In this connection, the two snap rings 16 (which will be designated later as sliding rings in accordance with their function as described in more detail below) should also be considered by virtue of the fact that, as revealed by FIG. 2, they likewise constrict when the housing is tightened and close off the annular gap 27 from the inside in the assembled state of the coupling. In this arrangement provision is made for the slit 17 in the snap rings to close in the final phase of assembly, and for the snap rings, through compression, to be brought into contact with the outer wall of the pipes to be coupled. In the process, a sliding seat results between the snap rings and the pipe wall; consequently the snap rings can also be designated as sliding rings. Thanks to this measure, the wall of the sleeve in the root area, i.e. in the area connecting the sealing lips 26 to the sleeve web 20, can be constructed without an axially thickened portion, that is, constructed to be relatively thin. This increases the flexing capacity of the sleeve in the root area so that, despite stiffening of the sleeve web, relative rubbing between the sealing surfaces of the sealing lips and the pipe wall cannot occur. The increase in the expandability of the coupling through the measures described is thus combined with an increase in service life.

The cross-sectional profiles shown in FIGS. 3-7 can be understood without further explanations; they are intended to indicate some of the wide range of geometries and materials which may be used in the design of the insert.

On the other hand, the trapezoidal cross section of the sliding rings 16 should be pointed out; in each case this results in an annular space 18 narrowing outwards in a wedge shape between the outer circumference of the sliding rings and the cylindrical jacket 11 of the housing. An end-face annular extension 19 of the sleeve engages in each annular space 18. Here, the sliding seat between the sliding rings 16 and the pipe wall is maintained, on the one hand as a result of compression of the sleeve and therefore also of the annular extensions upon assembly of the coupling, but then also under the action of the medium pressure, which presses the sliding rings 16 in the axial direction fully against the end walls 12 of the coupling housing, whereas in the radial direction it counteracts with a partial force the separation of the sliding seat even in the event of expansion of the housing.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a pipe coupling of the type comprising an elastomer sealing sleeve which is approximately C-shaped in cross-section and defines sealing lips which extend toward each other and are each supported on a sleeve web, and annular beads interposed between said lips and said web; a housing which surrounds the sleeve and which defines radial end walls and an axially extending longitudinal gap; a closure comprising tensioning bolts operative to constrict the housing; and an insert sheet which is inserted between the sleeve and the housing and bridges the longitudinal gap; wherein the sealing lips of the sleeve define first, larger dimensions before the housing is constricted and wherein it is possible for said sealing lips to be compressed in the circumferential direction and to be pressed snugly onto a pipe wall due to compression of the annular beads as the housing is constricted; the improvement comprising;

an annular insert which is elastically flexible and constrictable in a circumferential direction as the tensioning bolts constrict the housing but substantially rigid in the axial direction and which in an unconstricted state of the housing is supported with a base part against the sleeve web essentially over the full surface of the sleeve web.

2. The pipe coupling as claimed in claim 1, wherein the insert is constructed as a snap ring.

3. The pipe coupling as claimed in cliam 2, wherein the insert defines a V-shaped joint.

4. The pipe coupling as claimed in claim 1, wherein the insert comprises a radially inwardly directed annular rib having an inside diameter which, in a unconstricted state of the coupling, is larger than a nominal diameter of a pipe to be coupled, and, in a constricted state, is smaller than said nominal diameter.

5. The pipe coupling as claimed in claim 4, wherein the annular rib is interrupted.

6. The pipe coupling as claimed in claim 4, wherein the insert defines at least one circumferential section having an enlarged radius of curvature of the annular rib such that an inside diameter of the annular rib is correspondingly reduced.

7. The pipe coupling as claimed in claim 4, wherein an annular gap remaining between the radial end walls of the coupling housing and the pipe wall in an assembled state of the coupling is in each case closed by a sliding ring which can be compressed in the circumferential direction and which, bearing against the respective end wall, can be brought to bear on the pipe by the housing to form a sliding seat with the pipe.

8. The pipe coupling as claimed in claim 7, wherein the sleeve defines at each of its end faces an extension snugly enclosing the sliding ring.

9. The pipe coupling as claimed in claim 8, wherein the extension defines a cross-section tapering to the outside, and wherein the sliding ring forms together with the housing an annular space of corresponding profile.

10. The pipe coupling as claimed in claim 7, wherein the sliding ring is made of a high-molecular weight, compressible material.

11. The pipe coupling as claimed in claim 10, wherein the sliding ring is made of polyethylene.

12. The pipe coupling as claimed in claim 10, wherein the sliding ring is constructed as a snap ring which defines a slit configured to close directly before a final position when the housing is constricted.

13. The pipe coupling as claimed in claim 1, wherein an annular gap remaining between the radial end walls of the coupling housing and pipe wall in an assembled state of the coupling is in each case closed by a sliding ring which can be compressed in the circumferential direction and which, bearing against the respective end wall, can be brought to bear on the pipe by the housing to form an sliding seat with the pipe.

14. The pipe coupling as claimed in claim 13, wherein the sleeve defines at each of its end faces an extension snugly enclosing the constricted.

15. The pipe coupling as claimed in claim 14, wherein the extension defines a cross-section tapering to the outside, and wherein the sliding ring forms together with the housing an annular space of corresponding profile.

16. The pipe coupling as claimed in claim 13, wherein the sliding ring is made of a high-molecular weight, compressible material.

17. The pipe coupling as claimed in claim 16, wherein the sliding ring is made of polyethylene.

18. The pipe coupling as claimed in claim 16, wherein the sliding ring is constructed as a snap ring which defines a slit configured to close directly before a final position when the housing is constricted.

19. In a pipe coupling of the type comprising an elastomer sealing sleeve which is approximately C-shaped in cross-section and defines sealing lips which extend toward each other and are each supported on a sleeve web, and annular beads interposed between said lips and said web; a housing which surrounds the sleeve and which defines radial end walls and an axially extending longitudinal gap; a closure comprising tensioning bolts operative to constrict the housing; and an insert sheet which is inserted between the sleeve and the housing and bridges the longitudinal gap; wherein the sealing lips of the sleeve define first, larger dimensions before the housing is constricted and wherein it is possible for said sealing lips to be compressed in the circumferential direction and to be pressed snugly onto a pipe wall due to compression of the annular beads as the housing is constricted; the improvement comprising:
an annular insert which is elastically flexible and constrictable in a circumferential direction but substantially rigid in the axial direction and which is supported with a base part against the sleeve web essentially over the full surface of the sleeve web; wherein the insert is constructed as a snap ring.

20. The pipe coupling as claimed in claim 19, wherein the insert defines a V-shaped joint.

21. In a pipe coupling of the type comprising an elastomer sealing sleeve which is approximately C-shaped in cross-section and defines sealing lips which extend toward each other and are each supported on a sleeve web, and annular beads interposed between said lips and said web; a housing which surrounds the sleeve and which defines radial end walls and an axially extending longitudinal gap; a closure comprising tensioning bolts operative to constrict the housing; and an insert sheet which is inserted between the sleeve and the housing and bridges the longitudinal gap; wherein the sealing tips of the sleeve define first, larger dimensions before the housing is constricted and wherein it is possible for said sealing lips to be compressed in the circumferential direction and to be pressed snugly onto a pipe wall due to compression of the annular beads as the housing is constricted; the improvement comprising:
an annular insert which is elastically flexible and constrictable in a circumferential direction but substantially rigid in the axial direction and which is supported with a base part against the sleeve web essentially over the full surface of the sleeve web;
wherein the insert comprises a radially inwardly directed annular rib having an inside diameter which, in a unconstricted state of the coupling, is larger than a nominal diameter of a pipe to be coupled and, in a constricted state, is smaller than said nominal diameter;
wherein the insert defines at least one circumferential section having an enlarged radius of curvature of the annular rib such that an inside diameter of the annular rib is correspondingly reduced.

* * * * *

UNITED STATES PATENT AND TRADEMARK OFFICE
CERTIFICATE OF CORRECTION

PATENT NO. : 5,203,594

DATED : April 20, 1993

INVENTOR(S) : Immanuel Straub

It is certified that error appears in the above-indentified patent and that said Letters Patent is hereby corrected as shown below:

ON THE TITLE PAGE

Under the heading "FOREIGN PATENT DOCUMENTS", in the sixth line, please delete "7/1980" and substitute therefor --7/1986--.

In the Abstract, line 8, please delete "cross-sectionis" and substitute therefor --cross-section, is--.

Column 3, line 14, please delete "3i" and substitute therefor --31--.

IN THE CLAIMS

Col. 4, line 51, claim 1, after "comprising" delete ";" and substitute therefor --:--.

Col. 4, claim 4, line 67, after "coupled" delete ",".

Col. 5, claim 13, line 41, delete "an" and substitute therefor --a--.

Col. 5, line 44, claim 14, delete "constricted" and substitute therefor --sliding ring--.

UNITED STATES PATENT AND TRADEMARK OFFICE
CERTIFICATE OF CORRECTION

PATENT NO. : 5,203,594
DATED : April 20, 1993
INVENTOR(S) : Immanuel Straub

It is certified that error appears in the above-indentified patent and that said Letters Patent is hereby corrected as shown below:

Col. 6, line 37, claim 21, delete "tips" and substitute therefor --lips--.

Signed and Sealed this

Eighteenth Day of October, 1994

Attest:

BRUCE LEHMAN

*Attesting Officer*  *Commissioner of Patents and Trademarks*